United States Patent
Johnston

[15] 3,665,766
[45] May 30, 1972

[54] TEMPERATURE MEASURING APPARATUS

[72] Inventor: James Stewart Johnston, Bognor Regis, England

[73] Assignee: Rosemount Engineering Company Limited, Bognor Regis, England

[22] Filed: Oct. 27, 1969

[21] Appl. No.: 869,585

[30] Foreign Application Priority Data

Oct. 28, 1968 Great Britain...................50,985/68

[52] U.S. Cl............................................................73/342
[51] Int. Cl..........................................................G01k 3/06
[58] Field of Search................73/342; 324/62 R, 62 B, 65 R, 324/65 B

[56] References Cited
UNITED STATES PATENTS 2,456,499  12/1948  Fritzinger................................73/342
2,691,889  10/1954  Dion.........................................73/342

Primary Examiner—Louis R. Prince
Assistant Examiner—Denis E. Corr
Attorney—Dugger, Peterson, Johnson & Westman

[57] ABSTRACT

Apparatus for measuring the average temperature at a number of points comprises, at each sensing point, four terminal temperature responsive resistance elements. The current terminals of all the elements are connected in parallel constant current feed circuits. The voltage terminals of each element are connected, via a separate high impedance and switch for each element, to a voltage averaging circuit including datum voltage balancing means.

15 Claims, 3 Drawing Figures

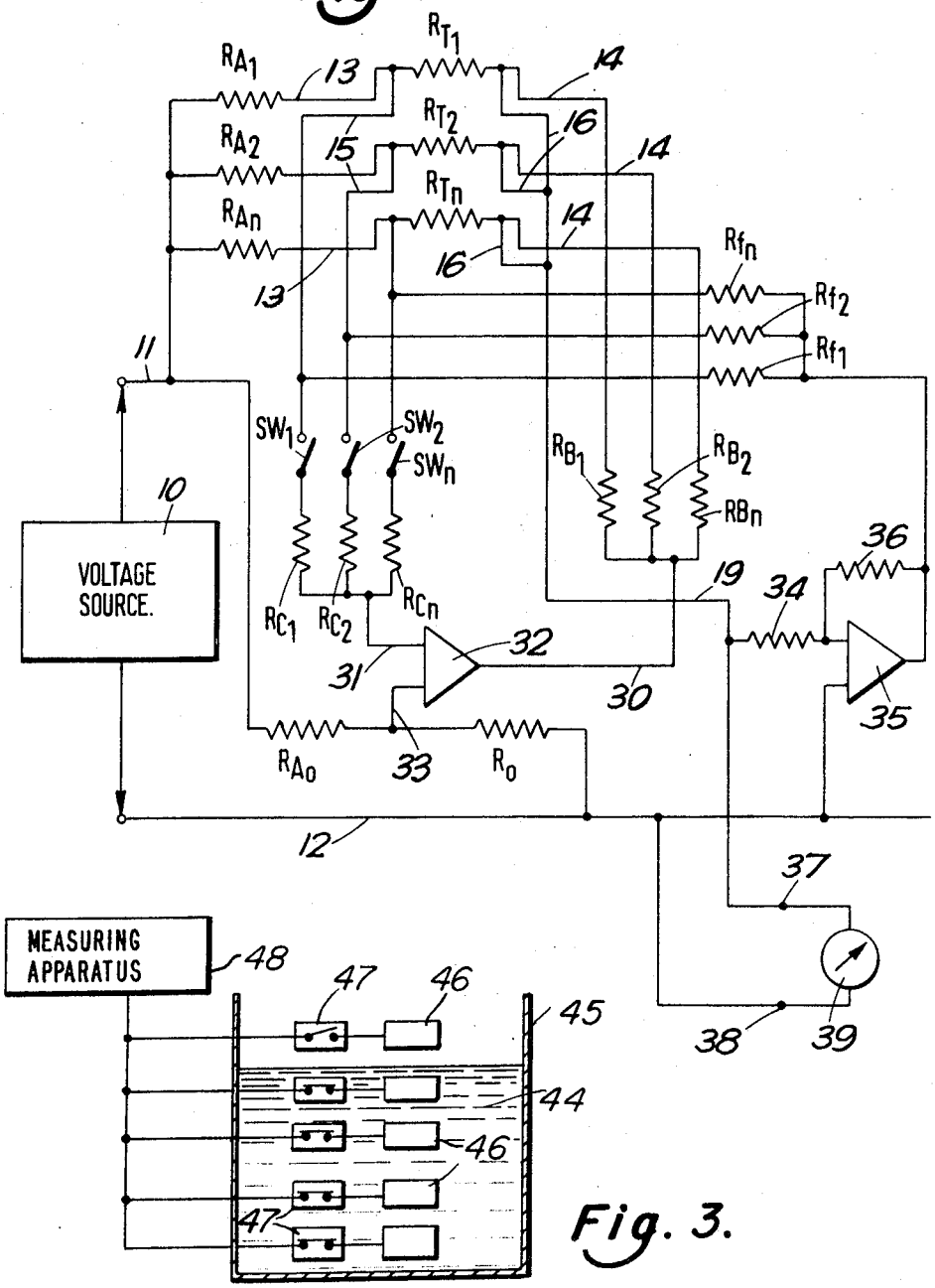

TEMPERATURE MEASURING APPARATUS

BACKGROUND OF THE INVENTION

1. Field of the Invention

This invention relates to apparatus for measuring temperature and is directed to an apparatus enabling the average temperature at any two or more selected points to be measured.

2. Prior Art

The common technique, using temperature responsive resistance elements, for finding the average of the temperatures at a number of points is to connect a number of identical elements in series and to measure the total resistance of the series elements. This total divided by the number of elements is the average resistance and is a measure of the average system. In such an arrangement, all the elements must remain connected in the circuit. Without changing the average circuit or recalibrating the system, it is not possible to change the number of sensing elements in use.

SUMMARY OF THE INVENTION

It is an object of the present invention to provide an informal form of average temperature measuring apparatus wherein the average temperature as sensed by any number of sensing elements may be determined without requiring any recalibration to make use of a different number of elements.

The requirement for measuring average temperature arises, for example, in large tanks and other liquid containing vessels. It may be required to find the average temperature of a liquid which may only partially fill a tank and therefore the average temperature is required only at the points where the fluid is present in the tank. As another example, it may be required to know what would be the resultant temperature when fluids from a number of different possible sources are mixed and in this case the average temperature may be required of the fluids in any selected sources.

The apparatus of the present invention makes use of temperature responsive resistance elements located at the various points where the temperature has to be determined for averaging. These resistance elements are, for convenience in the present application, considered as four terminal elements, that is to say each element has at each end a current terminal and a voltage terminal. The two current terminals will be referred to as the first and second current terminals and the two voltage terminals as the first and second voltage terminals, the first current terminal and the first voltage terminal being at one end and the second current terminal and the second voltage terminal being at the other end of the element.

According to this invention, apparatus for measuring the average temperature at any two or more points selectable out of a number of sensing points comprises, at each sensing point, a four-terminal temperature responsive resistance element at the same temperature, the potentials at the first voltage terminals of all the elements are the same and the potentials at the second voltage terminals are all the same, circuit means for each element including a high impedance connecting the first voltage terminal to a first output terminal, circuit means connecting in common to a second output terminal the second voltage terminals of all the temperature responsive elements and means responsive to the potential between the first and second output terminals or a potential related thereto.

With this apparatus, the voltage responsive means is responsive to the mean of the potentials across those sensing elements.

A very particular advantage with this circuit is that the average measurement is effected by a voltage averaging circuit to which any number of inputs can be connected. Thus the apparatus can be used for measuring the average temperature at any two or more points by making the aforesaid circuit means for each sensing element including a high impedance also include a switch whereby any one or more of the sensing elements may be selectively connected to the first output terminal. No alteration or adjustment of the averaging circuit is necessary on switching sensing elements into or out of the connection to the output terminal.

The current feeding means conveniently comprises a voltage supply source feeding in parallel each sensing element via a separate series resistance (of magnitude greater than that of the sensing element). However, as will be explained later, more complex current feeding circuits may be employed and, in particular, the sensing elements may be connected as separate feedback circuits of an operational amplifier.

In measuring the output voltage, it is usually preferable to measure the difference between the mean voltage across the sensing elements (i.e. the voltage at said output terminals) and the voltage across these elements at a datum temperature. Thus the measured voltage then represents the difference in mean temperature from the datum; this datum may be chosen as some convenient arbitrary value, e.g. 0° C. so that the mean temperature is measured in terms of degrees Celsius.

The invention furthermore includes within its scope apparatus for measuring the average temperature at any two or more points selected out of a number of sensing points comprising, at each sensing point, a four-terminal temperature responsive resistance element, a voltage supply source having first and second terminals, a separate series resistance connected between the first current terminal of each temperature responsive element and the first terminal of the supply source, circuit means connecting the second current terminal of each temperature responsive element to a return current path to the supply source, the aforesaid series resistances being of such magnitudes that, if the temperature responsive elements are all at the same temperature, the potential drops across the temperature responsive elements are equal, circuit means including a switch and a high impedance connecting the first voltage terminal of each responsive element to a first output terminal, circuit means connecting in common to a second output terminal the second voltage terminals of all the temperature responsive elements and means responsive to the potential between the two output terminals or to a potential related thereto.

It will be seen that, with this arrangement, by closing any selected switch or switches, the first voltage terminals of each of the selected elements are connected to the first output terminal. Because of the high impedances in the connections only small currents will flow to this terminal which forms a current summing point. The potential at this current summing point is the average potential at the first voltage terminals of all the temperature responsive elements connected into circuit. It will be noted that all the temperature responsive elements are permanently connected in circuit to be fed with current from the supply source and the switching is only effected in the measuring circuits. Because of the impedance in the measuring circuit, this has negligible effect on the currents through the sensing elements although the average potential is obtained at the current summing point by means of small current flows through these impedances. It will be particularly noted that the average is obtained without requiring the sensing elements to be connected in series and hence the system is operative independently of the number of sensing elements which are connected into circuit. It becomes possible, for example, to use automatic switches, for example float-operated switches so that a sensing element becomes effective by having its output connected into the measuring circuit as soon as it is immersed in a liquid in a tank which the liquid level can change. In such an arrangement, conveniently the switching is performed by a mercury switch inside a float containing the resistance element so that no linkage or contact problem externally of the float switch is involved. Operation of the switches connects the potentials across sensing elements into or out of the measuring circuit but does not require any modification or adjustment of the measuring circuit which gives an output dependant on the average of all sensing elements for which the switches are closed.

In the simplest form, the second current terminals are connected directly to the second terminal of the supply source. The difference of potential at the two output terminals may be measured by using an adjustable potential divider to form in effect a bridge circuit. The potential divider may comprise a first resistor corresponding to the aforesaid series resistances in series with the sensing elements and a second adjustable resistor corresponding to the sensing elements these two being connected in series between the first supply terminal and the second output terminal. Voltage responsive means are connected between the first output terminal and the junction of the resistors forming the potential divider. In such an arrangement either said second adjustable resistor can be adjusted to give zero output at the voltage responsive means or these voltage responsive means may be calibrated for measuring the output.

With resistance thermometers, the resistance of the leads has often to be taken into account as they may have a resistance comparable with that of the temperature responsive element. Reduction or elimination of the effect of lead resistances may readily be achieved in the arrangement described above. It will be recalled that the second voltage terminals of each of the temperature responsive elements were connected together and to the second output terminal. The second current terminals of the temperature responsive elements may each be connected to the second supply terminal through a separate further resistor which further resistors are of magnitudes proportioned according to the lead resistances to the respective second current terminals. If a potential divider network is used for a bridge comparison circuit as previously described, this potential divider network may include a third resistor connected between the aforesaid second adjustable resistor and the second supply terminal. It will be seen that this arrangement is analogous to a Kelvin double bridge with the source and detector interchanged. The further resistors connected to the second voltage supply terminal form the auxiliary ratio arms. These further resistors are in series with the current supply leads to the temperature responsive elements. They may have resistances small compared with the series resistances connected to the first current terminals of the elements. These latter series resistances, if they are of magnitude high compared with the resistances of the elements, ensure that the current through each element remains substantially constant. Thus the further resistances can be proportioned in accordance with the lead resistances to the second current terminals to ensure that the second voltage terminals are at the same potential irrespective of the supply leads to the second current terminals. In the present case the operation may be more clearly envisaged by considering the four terminals of each temperature responsive element. The resistance of the lead to the first current terminal is small compared with the series resistance between the first voltage supply terminal and the first current terminal; the magnitude of the lead resistance is therefore substantially immaterial and changes in this lead resistance will therefore have negligible effect. Changes in the resistance of the lead from the first voltage terminal again will have negligible effect so long as these changes are small compared with the series impedance connected to this lead. The leads connected to the second voltage terminals are all connected together and these points are at substantially the same potential. No current therefore flows through these leads. The second current terminals of the various temperature responsive elements are connected to the aforementioned further resistors and hence the lead resistances are compensated; changes in these lead resistances have little effect.

Instead of using a bridge balancing technique for determining the average output voltage, other measuring circuits may be employed. It is possible, for example, to switch the temperature responsive elements across an amplifier in the manner described and claimed in the specification of British Pat. No. 1,027,566 and to provide, for each sensing element, a separate negative resistance element which is also switched across the amplifier with the sensing element so as to give a linear relationship between voltage output and temperature.

BRIEF DESCRIPTION OF THE DRAWINGS

In the accompanying drawings, FIGS. 1 and 2 are circuit diagrams illustrating embodiments of the invention; and FIG. 3 is a diagram illustrating one application of the invention.

DESCRIPTION OF THE PREFERRED EMBODIMENTS

Figure 1:
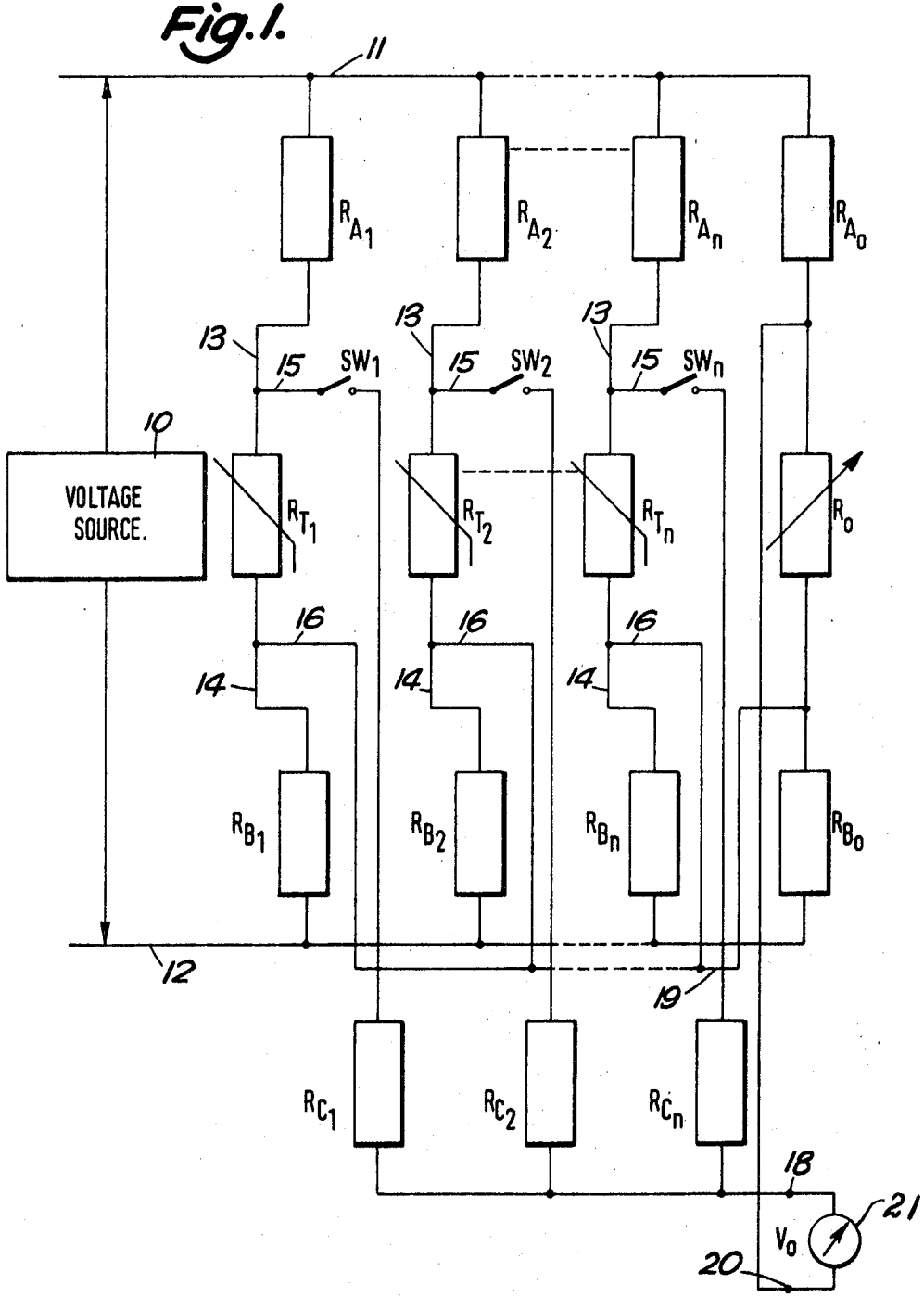

Referring to FIG. 1 of the drawings there is shown a potential supply source 10 which maintains a supply voltage across two leads 11 and 12 which leads constitute the aforementioned first and second voltage supply terminals. A number of temperature responsive elements $R_{T_1} R_{T_2} ... R_{T_n}$ are provided each having first and second current leads 13, 14 and first and second leads 15, 16. The first current lead 13 of each of the sensing elements is connected to one terminal of an associated resistor $R_{A_1} R_{A_2} ... R_{A_n}$, the other terminals of which resistors are connected in common to the lead 11. These resistors $R_{A_1}$ etc. have a high resistance so that the currents flowing through the various sensing elements are constant irrespective of the variations due to temperature. The magnitudes of the resistors are such that, at equal temperatures, the voltage drops across the sensing elements are all equal. Most conveniently the sensing elements are similar and the series resistors $R_{A_1} R_{A_2}$ etc. are of equal magnitude. The second current leads 14 of the temperature responsive elements are connected respectively to further resistors $R_{B_1} R_{B_2} ... R_{B_n}$ which, in this particular example, are of a magnitude smaller than $R_{A_1} R_{A_2}$ etc., the second terminals of these resistors $R_{B_1} R_{B_2}$ etc. being connected to the lead 12.

The first voltage leads 15 from each of the temperature responsive elements are connected via switches $SW_1$ $SW_2...SW_n$ to respective associated resistors $R_{C_1} R_{C_2} ... R_{C_n}$, the other terminals of which risistors are connected in common to a first output terminal 18. The second voltage leads of all the temperature responsive elements are connected in common to a lead 19. The average temperature is represented, as will be explained later, by the voltage between the terminal 18 and lead 19. In this particular embodiment a bridge comparison circuit is employed to measure this voltage and the ratio arms of the bridge are constituted by resistors $R_{A_0}$ $R_o$ and $R_{B_0}$ connected in series in that order between the leads 11 and 12. The junction of $R_{A_0}$ and $R_o$ is connected to another output terminal 20 and the junction of $R_o$ and $R_{B_0}$ is connected to the aforementioned lead 19. This bridge circuit provides an output at terminals 18, 20 which depends on the output between terminal 18 and lead 19 but differing therefrom by the potential across resistor Ro. The voltage between the output terminals 18, 20 is applied to a null balance indicator 21 in which case the resistor $R_o$ is made an adjustable resistor for balancing the bridge. The setting of this adjustable resistor measures the average temperature. Alternatively, this voltage between the output terminals 18, 20 may be used directly as a measure of the average temperature.

With the circuit described, all the temperature responsive elements are permanently connected across the supply lines 11, 12 so that current flows through these elements. Because the series resistors $R_{A_1}$ etc. have a high resistance compared with the sensing elements, the current flow through each sensing element is constant. Any selected elements may be connected to the measuring circuit by closing the appropriate switch $SW_1$ $SW_2$ etc. These switches are in the voltage output lines and, because of the high magnitude resistors $R_{C_1} R_{C_2}$ etc., negligible current will flow through these lines. The first voltage output terminals of all the elements will reach a potential which is the average of the potentials on those voltage output lines connected to the output circuit. This is achieved by small currents flowing through the resistors $R_{C_1} R_{C_2}$ etc. These currents however are so small that they do not affect the potentials across the sensing elements.

It will be seen that if one considers the elements $R_{A_1}, R_{T_1}$ and $R_{B_1}$ together with the elements $R_{A_0} R_o$ and $R_{B_0}$, these are connected in a Kelvin double bridge circuit which is of conventional form except that the source and detector have been interchanged. The resistors $R_{B_1}$ and $R_{B_0}$ in this case constitute the auxiliary resistors of the Kelvin double bridge enabling low resistances to be measured whilst eliminating the effect of lead resistances. In the circuit shown in the drawing, the effect of lead resistances can be considered in the following way. Any changes in the resistance of the first current lead from each sensing element is negligible compared with the series resistance $R_{A_1}$ and will not have any effect on the measurement. Similarly any change in resistance of the first voltage lead has no effect because this resistance is small compared with the resistors $R_{C_1}$. The second voltage leads from the temperature responsive elements are connected to a point at substantially the same potential on the balancing circuit and hence no current will flow through these leads. Therefore the resistance of the second voltage lead will have no effect. The second current leads from the various temperature responsive elements are in series with the resistors $R_{B_1}$, $R_{B_2}$ etc. and changes in these lead resistances are small compared with the magnitude of $R_{B_1}$ etc; hence such changes will have negligible effect. It will be borne in mind that the resistance $R_{B_0}$ serves to compensate for the average lead resistance of the second current leads.

The aforementioned switches $SW_1$ $SW_2$ etc. may be operated manually or automatically. They may be for example float-switches as previously described, e.g. mercury switches inside floats containing the temperature responsive elements. As another example, the switches may be operated automatically in accordance with the selection of fluid supplies from different sources so that an indication is obtained of the average temperature when the fluids from the selected sources are mixed.

It is preferred to switch only the first voltage lead from each temperature responsive element. It would be possible to switch more than one lead but use of further switch contacts would give a possibility of transient false readings if the switch contacts are not operated simultaneously.

As an example of the operation of this circuit, assume that the supply voltage $V_B$ across the leads 11, 12 is 20V, $R_T$ for each temperature responsive element is 100 ohms at $T = 0°$ C, $R_{A_1}$ $R_{A_2}$ etc. are each 6.9 Kohms, $R_{B_1}$ $R_{B_2}$ etc. are each 1 Kohm. A current of 2.5 mA flows in each section containing a temperature responsive element. If these elements change resistance by 0.4 ohms/°C then the voltage change is 1mV/°C. For the present, any non-linearity of the resistance-temperature relationship of the sensing elements and any non-linearity due to fall in the bridge current as $R_o$ increases can be ignored. Consider a system of three active elements $R_{T_1}$, $R_{T_2}$ and $R_{T_3}$ and a passive section $R_o$, also of 100 ohms. If the temperatures of the sensing elements $R_{T_1}$ $R_{T_2}$ and $R_{T_3}$ are respectively $T_1 = 10°$ C. $T_2 = 20°$ C. and $T_3 = 30°$ C, the potentials on the various lines 15 with respect to line 20 would be 10mV, 20mV and 30mV respectively. These potentials are combined in the resistor network $R_{c_1}$ $R_{c_2}$ and $R_{c_3}$ and, on closure of the switches, will be impressed on that network with an output resistance of $$R_{T_1} R_{A_1}/R_{T_1} + R_{A_1}$$

for the first sensing element $R_{T_1}$ and output resistances given by corresponding expressions for the other sensing elements.

In this example, $R_{T_1} = 104$ ohms, $R_{T_2} = 108$ ohms and $R_{T_3} = 112$ ohms. The output resistances are therefore 102.5 ohms, 106.4 ohms and 110.4 ohms respectively. If the average formed in the network $R_{c_1}$ $R_{c_2}$ and $R_{c_3}$ is to give substantially the same weight to the three constituents, the resistors in this network must be large compared with the variations in output resistance. Therefore $R_{c_1}$ $R_{c_2}$ and $R_{c_3}$ must be large compared with 7.9 ohms. Assuming these resistors are each 10 Kohm, the actual output voltage is 19.997 mV compared with the correct value of 20 mV (corresponding to the true average temperature of 20° C). If the resistors $R_{c_1}$ $R_{c_2}$ and $R_{c_3}$ are 1 kohm, the output voltage is 19.97 mV.

To explain the effect of changes in lead resistance, a change in lead resistance of 1 ohm in any one lead will be considered. It will be readily found that:

a. 1 ohm change in all leads 13 will produce a change in output of 0.012 of reading (i.e. 0.002 °C in this example).

b. 1 ohm change in lead 13 of one thermometer only will produce a change in the temperature indicated by that thermometer of 0.03° C and hence of 0.01° C in the output.

c. A change of 1 ohm in all leads 15 would have no effect.

d. A change of 1 ohm in one lead 15 would change the weight given to that measurement by 0.01 percent or 0.1 percent in forming the average depending upon the value of $R_c$ used (i.e. by 0.003° C or 0.0003° C).

e. A change affecting any one or all of leads 16 would have no effect.

f. A change of 1 ohm in all leads 14 would have the same effect as in (a).

g. A change in any one lead 14 by 1 ohm would, in this example, have one quarter of the effect shown in (a).

The system is thus very tolerant of lead resistance changes in contrast to the usual method of averaging which involves connecting thermometers in series.

FIG. 2 of the drawings illustrates another embodiment of the invention. In this construction, the temperature responsive elements are platinum resistance elements connected as feedback resistors in an operational amplifier. For each temperature sensing element, there is also provided a separate negative resistance which is also switched across the amplifier. This construction is used to give a linear relationship between the voltage output and temperature. As is explained in the specification of British Patent No. 1,027,566, electrical resistance thermometers have a relationship between the resistance $R$ and temperature $t$ which may be expressed as $R = R_0 (1 + At + Bt^2)$ where $R_o$ is the resistance at a datum temperature. $A$ and $B$ are constants. Terms in higher powers of $t$ can be neglected for practical purposes. For a platinum resistance thermometer $A$ is positive and $B$ is negative. In the aforementioned specification, it is explained how, by connecting a sensing element in a feedback circuit of a high gain amplifier having a constant current input and by providing a phase inverting feedback circuit for the amplifier arranged to give an effective negative resistance feedback across the sensing element, it is possible to compensate for the non-linearity in the relationship between the output voltage of the amplifier and the temperature of the sensing element.

In FIG. 2, for convenience of understanding, the same reference characters are used as in FIG. 1 to indicate corresponding components. Referring to FIG. 2 there is shown three temperature sensing elements $R_{T_1}$, $R_{T_2}$ and $R_{T_n}$ each having current terminals and voltage terminals. The first current terminal of each of the sensing elements is connected through an appropriate resistor $R_{A_1}$, $R_{A_2}$ or $R_{A_n}$ to a lead 11 connected to one terminal of the supply source 10. The second current terminals of the sensing elements are connected by leads 14 through respective resistors $R_{B_1}$, $R_{B_2}$ and $R_{B_n}$ to a common line 30. The first voltage terminals of each of the sensing elements are connected by leads 15 through respective switches $S_{W_1}$ and $S_{W_2}$ and $S_{W_n}$ and respective series resistors $R_{c_1}$ and $R_{c_2}$ and $R_{c_n}$ to a common lead 31. The second voltage terminals of the sensing elements are connected as in FIG. 1 by leads 16 to a common lead 19.

In the arrangement of FIG. 2 there is provided a high-gain amplifier 32. This amplifier with the associated circuits forms an operational amplifier with a resistive input and a resistive feedback. The input to the amplifier is the signal on the aforementioned lead 31. The amplifier has a datum input lead 33 which is connected to a potential divider formed by the resistors $R_{A_0}$ and $R_o$. This potential divider is connected across the potential supply source 10. The output of the amplifier 32 is applied to the aforementioned common lead 30 so that such of the temperature sensing elements as are connected by their respective switches into the circuit constitute feedback resistances across the amplifier. As is well known, such an operational amplifier provides a feedback current which substantially balances the input current so that there is negligible potential difference between the leads 31, 33. This very small potential difference because of the high gain of the amplifier 32, will give the required output. The required output current is drawn from the datum input, i.e. from the potential divider $R_{A_0}$, $R_o$. The output voltage of the amplifier on line 30 is proportional to the fixed input voltage applied to the input circuit, the proportionality factor depending on the ratio of the effective feedback resistance to the effective input resistance. If the lead 33 were connected directly to the lead 12, i.e. to one terminal of the voltage source 10, the input voltage would be the total voltage of the source 10. The effective input resistance would be formed by the resistors $R_{A_1}$, $R_{A_2}$, $R_{A_n}$ which are switched into circuit. The resistors $R_{c_1}$, $R_{c_2}$ and $R_{c_n}$ would have negligible effect as they are in voltage leads and carry negligible current. In the embodiment of FIG. 2, the datum voltage is obtained from a potential divider. The resistors $R_{A_0}$ and $R_o$ provide a datum potential which can be set to give zero output voltage at some datum temperature, for example 0° C. Obviously however any other datum point could be chosen if so desired.

As in the arrangement of FIG. 1, the sensor elements $R_{T_1}$, $R_{T_2}$ and $R_{T_n}$ of FIG. 2 are fed with constant currents from the potential supply source 10 through their respective current input terminals. The resistors $R_{A_1}$, $R_{A_2}$ and $R_{A_n}$ are connected in series with the first current terminals of the respective sensors $R_{T_1}$, $R_{T_2}$ and $R_{T_n}$ whilst the resistors $R_{B_1}$, $R_{B_2}$ and $R_{B_n}$ are connected in series with the second current terminals of the respective sensors. The common point 30 to which the resistors $R_{B_1}$, $R_{B_2}$ and $R_{B_n}$ are connected is fed with the necessary current from the lead 30 at the output of the amplifier 32. In FIG. 2 the operational amplifier 32 serves to keep the current through each sensing element constant. It will be remembered that, with an operational amplifier having a resistive feedback and a resistive input, the feedback current is proportional to the input current. The input current for example for the branch containing sensing element $R_{T_1}$ is determined solely by the magnitudes of the resistor $R_{A_1}$ and the potential between the input terminal 11 and the junction of resistors $R_{A_0}$ and $R_o$. The resistors $R_{A_1}$, $R_{A_2}$ and $R_{A_n}$ are chosen so that the voltage drops across the sensing elements at a datum temperature are all equal to one another and equal to that across $R_o$.

It will be seen therefore that the circuit of FIG. 2 as thus far described operates in a manner analogous to that of FIG. 1. The arrangement of FIG. 2 however has the further components, which will now be described, for compensating for non-linearity of the relationship between resistance and temperature of the sensing elements.

The compensation for non-linearity is effected by providing a negative resistance as an additional feedback across each sensing element $R_{T_1}$, $R_{T_2}$, $R_{T_n}$. To do this, the aforementioned lead 19 from the second voltage terminals of the sensing elements is connected via an input resistor 34 to a second operational amplifier 35 having a feedback resistor 36. The resistors 34 and 36 are made equal so that the amplifier 35 with these resistors constitutes a polarity inverter giving unity gain. The output of the amplifier 35 is applied via resistors $R_{F_1}$, $R_{F_2}$ and $R_{F_n}$ respectively to the leads 15 between the sensing elements $R_{T_1}$, $R_{T_2}$ and $R_{T_n}$ and their respective switches $S_{W_1}$, $S_{W_2}$ and $S_{W_n}$.

The ratio $R_{A_0}$ to $R_o$ is made equal to the ratios (which are also made equal) at the datum temperature of $R_{A_1}$ to $R_{T_1}$, $R_{A_2}$ to $R_{T_2}$ and $R_{A_n}$ to $R_{T_n}$. In other words, the voltage drops across the sensing elements are to be the same at the datum temperature.

Consider that only the sensing element $R_{T_1}$ is switched into the circuit.

Without the amplifier 35 and its associated circuits, the output voltage $V_o$ of the amplifier 32 on line 30 with respect to line 12 would be given by $$V_o = -\frac{V_1}{R_1} R_o (At + Bt^2)$$

where $R_1$ is the effective input resistance as defined above.

By adding the inverting stage 35 and feedback resistor $R_{F_1}$ $$V_o = -\left(\frac{V_1}{R_1} - \frac{V_o}{R_{F_1}}\right)(R_o At + R_o B t^2)$$

Hence $V_o = -\dfrac{V_1}{R_1}\left[R_o At + \left(R_o B + \dfrac{R_o^2 A^2}{R_{F_1}}\right)t^2 + \cdots\right]$ By making $R_{F_1} = -R_o A/B$, then the term in $t^2$ is eliminated. Similarly, the other resistors $R_{F_2}$ and $R_{F_n}$ are set to compensate for the $t^2$ terms of their associated sensing elements.

It will thus be seen that, by providing the negative feedback, it is possible to eliminate the effect of the term proportioned to the square of the temperature. It will be borne in mind that B is always negative for platinum and it is thus possible to choose a positive value for the resistors $R_{F_1}$, $R_{F_2}$ and $R_{F_n}$ which will give a substantially linear output voltage from the amplifier 32 with respect to temperature over a range of temperatures. If the range is large, the higher order terms may produce some non-linearity but this will be very much smaller than would occur without the compensation provided by the negative resistance feedback circuit. It will be appreciated that the magnitudes of the resistors $R_{F_1}$, $R_{F_2}$ and $R_{F_n}$ have to be chosen to give the required compensation for non-linearity at a selected temperature value. It is readily possible in practice to get a high degree of compensation for non-linearity over large temperature ranges.

In the arrangement of FIG. 2, the output indication is obtained as a voltage at output terminals 37, 38 and is applied to a voltage measuring device 39. The terminal 37 is connected to the aforementioned common line 19 which is common to the second voltage terminals of the sensing elements. The output terminal 38 is connected to the line 12 which is connected to one of the terminals of the input potential supply source 10 that is to say the reference datum level. The terminal 37 is connected to the voltage terminals of the sensing element and not to the output lead 30 from the amplifier 32 in order to avoid the effects of lead resistance. It will be apparent that, since the input resistors $R_{A_1}$, $R_{A_2}$ and $R_{A_n}$ have magnitudes large compared with the resistances of the leads 13, the resistance of these leads will have negligible effect on the current through the temperature sensors. The leads 15 are voltage leads carrying negligible current and so their resistances can be ignored. Likewise the leads 16, 19 are voltage leads carrying negligible current. The resistors 34, 36 can be of large magnitude so that the amplifier 35 does not draw any appreciable current through the lead 19. The output of the amplifier 32 is applied through the resistors $R_{B_1}$, $R_{B_2}$ and $R_{B_n}$ and the leads 14 to the current terminals of the sensing elements but, by taking the output voltage from voltage terminals at lead 19, the resistances of the leads 14 are not included. The resistors $R_{B_1}$, $R_{B_2}$ and $R_{B_n}$ serve, as in the arrangement of FIG. 1, to compensate for the average resistance of the second current leads 14 so enabling low resistances to be measured whilst eliminating the effect of lead resistances.

It will be noted that in the arrangement of FIG. 2, the measurement is, as in the arrangement of FIG. 1, a measurement of the mean voltage between the common outputs from the first and second voltage terminals. In FIG. 1 the measurement is essentially a measurement of the voltage between terminal 18 and lead 19, but, by means of the potential divider $R_{A_0}$, $R_o$, this voltage is altered to represent the difference in temperature from a datum value, the datum being set by $R_o$. In FIG. 2 it will be seen that the output voltage is essentially the voltage between the leads 31 and 19. The lead 19 is connected to one of the output terminals 37. The amplifier 32 serves to maintain a negligible input to the amplifier and thus the lead 31 is at the same potential as the lead 33 that is a reference potential set by the resistors $R_{A_0}$ and $R_0$. This corresponds to the output terminal 20 of FIG. 1 which is connected to the junction between the resistors $R_A$ and $R_0$. Just as in FIG. 1, $R_0$ of FIG. 2 is set to determine the datum temperature and then the voltage across terminals 37, 38 is proportional to the mean temperature, measured as a difference from the datum temperature.

FIG. 3 illustrates the application of the invention to the measurement of the average temperature of a liquid 44 in a large tank 45. The temperature may be different at different levels and a number of sensors 46 (only a few of which are illustrated and not to scale) are provided at different levels, each with a float-operated switch 47 for connecting the sensor in circuit only if it is below the liquid level. For sensors below the liquid level, the switches are closed. These switches correspond to the switches $SW_1$ $SW_2$ etc. of FIG. 1 or FIG. 2. The sensors are the resistance thermometer elements $R_{T_1}$ $R_{T_2}$ etc; in FIG. 3 the remainder of the circuit is illustrated diagrammatically at 48.

I claim:

1. Apparatus for measuring the average temperature at any two or more sensing points comprising, at each sensing point, a four-terminal temperature responsive resistance element having first and second current leads and first and second voltage leads, said first voltage lead in each instance being connected between one end of the element and the first current lead and the second voltage lead in each instance being connected between the other end of the element and the second current lead, current feeding means for feeding a constant current through each element via the current leads of the elements, said current feeding means including first and second common terminals and for each element, a first resistor in series with the element and connected at one end to the first current lead of the element and a second resistor in series with the element and connected at one end to the second current lead, the other ends of said first resistors being connected to said first common terminal and the other ends of said second resistors being connected to said second common terminal, the current feeding means being arranged so that, if the elements are all at the same temperature, the potentials at the connections of the first voltage leads of all the elements are the same and the potentials at the connections of the second voltage leads are all the same, circuit means for each element including a high impedance connecting the first voltage lead to a common first output terminal, circuit means connecting in common to a second output terminal the second voltage leads of all the elements, and means responsive to a potential related to the potential between the first and second output terminals wherein the values of said first resistors are sufficiently large that current flow through each of said responsive elements is substantially constant, wherein the values of said second resistors are large compared with changes in the lead resistances and the values of the lead resistances are substantially equal for each of said responsive elements, and wherein the values of said impedances are sufficiently large that currents therethrough do not effectively disturb the potentials of said voltage leads.

2. Apparatus as claimed in claim 1 and having a switch in series with each of said high impedances whereby the output of any chosen sensing element may be selected for averaging.

3. Apparatus as claimed in claim 1 and having a potential divider connected between said common terminals, said potential divider having at least two taps, and wherein said second output terminal is connected to one tap on the divider and wherein said means responsive to the potential related to the potential between the first and second output terminals comprises means for measuring the potential between said first output terminal and another tap on the divider.

4. Apparatus for measuring the average temperature at any two or more points selectable out of a number of sensing points comprising, at each sensing point, a four-terminal temperature responsive resistance element having first and second current leads and first and second voltage leads, said first voltage lead in each instance being connected between one end of the element and the first current lead and the second voltage lead in each instance being connected between the other end of the element and the second current lead, a voltage supply source having first and second terminals, a separate series resistance connected between the first current lead of each temperature responsive element and the first terminal of the supply source, circuit means including further series resistances connecting between the second current lead of each temperature responsive element to a return current path to the supply source, the aforesaid series resistances being of such magnitude that, if the temperature responsive elements are all at the same temperature, the potential drops across the temperature responsive elements are equal, circuit means for each element including a switch and a high impedance connected to the first voltage lead of each responsive element to a common first output terminal, circuit means connecting in common to a second output terminal the second voltage leads of all the temperature responsive elements, a potential divider having at least two taps connected between said first and second terminals of the voltage supply source, means connecting said second output terminal to one tap on said divider, and means responsive to the potential between said first output terminal and a second tap on said divider wherein the values of each said first mentioned separate series resistance is sufficiently large that current flow through each of said responsive elements is substantially constant, wherein the values of said further series resistances are larger compared with the changes of lead resistances and the values of the lead resistances are substantially equal for each of said responsive elements, and wherein the values of said impedances are sufficiently large that currents therethrough do not effectively disturb the potentials of said voltage leads.

5. Apparatus as claimed in claim 4 wherein the potential divider is adjustable and wherein the voltage responsive means is a null balance detector.

6. Apparatus for measuring the average temperature at any two or more sensing points comprising, at each sensing point, a four-terminal temperature responsive resistance element having first and second current terminals and first and second voltage terminals, current feeding means for feeding a constant current through each element via the current terminals of the elements, said current feeding means including first and second common terminals and for each element, a first resistor in series with the element and connected at one end to the first current terminal of the element and a second resistor in series with the element and connected at one end to the second current terminal, the other ends of said first resistors being connected to said first common terminal and the other ends of said second resistors being connected to said second common terminal, the current feeding means being arranged so that, if the elements are all at the same temperature, the potentials at the first voltage terminals of all the elements are the same and the potentials at the second voltage terminals are all the same, circuit means for each element including a high impedance connecting the first voltage terminal to a common first output terminal, circuit means connecting in common to a second output terminal the second voltage terminals of all the elements, means responsive to a potential related to the potential between the first and second output terminals, an operational amplifier having an input and an output, a constant voltage source, a resistive input connecting said constant voltage source to said amplifier and means connecting the first said common output terminal to the amplifier input and the second common terminal to the amplifier output.

7. Apparatus as claimed in claim 6 wherein the means responsive to the potential between the two output terminals is connected between the common second voltage terminals of the temperature responsive elements and a datum potential source for the input of the operational amplifier.

8. Apparatus as claimed in claim 7 wherein the current input terminal of the operational amplifier is connected to a tap on a potential divider connected across the supply source.

9. Apparatus as claimed in claim 8 wherein said means responsive to the potential between the two output terminals is connected between the second voltage terminals of the temperature responsive elements and the supply source terminal which is not connected to the first current input terminals of the temperature sensing elements.

10. Apparatus as claimed in claim 6 wherein the sensor elements have a resistance $R=R_t(1+At+Bt^2)$ where $R_t$ is the resistance at datum temperature T is the temperature above the datum and $A$ and $B$ are coefficients and where $A$ has a positive value and $B$ has a negative value and wherein there is provided a phase inverting feedback circuit across said operational amplifier to give a separate feedback current dependent on the voltage at the common second voltage terminals of the temperature sensing element and feeding back the currents separately to the current input terminals of the respective sensing elements, the feedback circuits having resistors for the various feedbacks proportioned to compensate for the nonlinearity between the resistance of each sensing element and temperature.

11. Apparatus as claimed in claim 6 and for measuring the average temperature at any two or more points wherein, for each sensing point, said circuit means including a high impedance also includes a switch whereby the outputs of any one or more of the sensing elements may be selectively connected to the input of said operational amplifier.

12. Apparatus as claimed in claim 11 wherein the switches are float-operated switches each of which closes when the associated temperature responsive element is immersed in a liquid.

13. Apparatus for measuring the average temperature at any two or more points selectable out of a number of sensing points comprising, at each sensing point, a four-terminal temperature responsive resistance element having first and second current terminals and first and second voltage terminals, current feeding means for feeding a constant current through each element via the current terminals of the elements, the current feeding means including, for each element and in series therewith a resistor connected to the first current terminal and a resistor connected to the second current terminal, the current feeding means feeding the elements being arranged so that, if the elements are all at the same temperature, the potentials at the first voltage terminals of all the elements are the same and the potentials at the second voltage terminals are all the same, circuit means for each element including a switch and a high impedance connecting the first voltage terminal to a common first output terminal, circuit means connecting in common to a second output terminal the second voltage terminals of all the temperature responsive elements and means responsive to the potential between the first and second output terminals, said switches being float-operated switches each of which closes when the associated temperature responsive element is immersed in a liquid.

14. Apparatus for measuring the average temperature at any two or more sensing points comprising:
 a. at each sensing point, a four-terminal temperature responsive resistance element having first and second current terminals and first and second voltage terminals,
 b. current feeding means for feeding a constant current through each element via the current terminals of the element, said current feeding means comprises an operational amplifier, each element being connected as a separate feedback circuit across the amplifier and each having an associated input resistance,
 c. a common voltage source feeding said input resistances,
 d. said input resistances and current feeding means being such that if all the elements are at the same temperature, the potentials at the first voltage terminals of all the elements are the same and the potentials at the second voltage terminals are all the same,
 e. circuit means for each element including a high impedance connecting the first voltage terminal to a common first output terminal,
 f. circuit means connecting, in common to a second output terminal the second voltage terminals of all the temperature responsive elements, and
 g. means responsive to the potential between the first and second output terminals.

15. Apparatus for measuring the average temperature at any two or more points selectable out of a number of sensing points comprising, at each sensing point, a four-terminal temperature responsive resistance element having first and second current terminals and first and second voltage terminals, a voltage supply source having first and second terminals, a separate series resistance connected between the first current terminal of each temperature responsive element and the first terminal of the supply source, an operational amplifier for feeding current to said second current terminal of each temperature responsive element, a return current path connecting the first current terminals to the supply source, the aforesaid series resistances being of such magnitudes that, if the temperature responsive elements are all the same temperature, the potential drops across the temperature responsive elements are equal, circuit means for each element including a switch and a high impedance connecting the first voltage terminal of each responsive element to the input of said operational amplifier, circuit means connecting in common to a second output terminal the second voltage terminals of all the temperature responsive elements and means responsive to the potential between the two output terminals.

* * * * *